US012062277B2

(12) United States Patent
Beaver et al.

(10) Patent No.: US 12,062,277 B2
(45) Date of Patent: *Aug. 13, 2024

(54) COMPOSING AND TRANSMITTING CUSTOMIZED ALERT MESSAGES TO RESPONDERS

(71) Applicant: Mitchell County Sheriff's Office, Osage, IA (US)

(72) Inventors: Gregory Gerald Beaver, St. Ansgar, IA (US); Devin Schwiesow, St. Ansgar, IA (US); Armin Henkel, Hamburg (DE); Dayton Smith, St. Ansgar, IA (US); Collin Kramer, Mason City, IA (US); Christian Eckard, Cresco, IA (US); Alex Swenson, Osage, IA (US); Jeanetta Plotzke, Osage, IA (US)

(73) Assignee: MITCHELL COUNTY SHERIFF'S OFFICE, Osage, IA (US)

( * ) Notice: Subject to any disclaimer, the term of this patent is extended or adjusted under 35 U.S.C. 154(b) by 461 days.

This patent is subject to a terminal disclaimer.

(21) Appl. No.: 17/315,970

(22) Filed: May 10, 2021

(65) Prior Publication Data

US 2021/0335124 A1 Oct. 28, 2021

Related U.S. Application Data

(63) Continuation of application No. 17/025,291, filed on Sep. 18, 2020, now Pat. No. 11,004,327.

(60) Provisional application No. 62/902,147, filed on Sep. 18, 2019.

(51) Int. Cl.
*G08B 27/00* (2006.01)
*G08B 25/00* (2006.01)
*G08B 25/01* (2006.01)

(52) U.S. Cl.
CPC ......... *G08B 27/001* (2013.01); *G08B 25/006* (2013.01); *G08B 25/007* (2013.01); *G08B 25/016* (2013.01); *G08B 27/008* (2013.01)

(58) Field of Classification Search
CPC .. G08B 27/001; G08B 25/006; G08B 25/007; G08B 25/016; G08B 27/008
USPC .................................................... 455/404.01
See application file for complete search history.

(56) References Cited

U.S. PATENT DOCUMENTS

| | | | | |
|---|---|---|---|---|
| 8,180,274 | B2 | 5/2012 | Bender | |
| 8,238,869 | B2 | 8/2012 | Brayton | |
| 9,071,579 | B1 | 6/2015 | Bender | |
| 9,342,975 | B2 * | 5/2016 | Titus | H04M 11/04 |
| 9,691,386 | B2 * | 6/2017 | Formhals | G10L 15/26 |
| 10,045,187 | B1 * | 8/2018 | Soleimani | H04W 4/90 |
| 10,419,399 | B2 | 9/2019 | Bender | |

(Continued)

*Primary Examiner* — Maria El-Zoobi
(74) *Attorney, Agent, or Firm* — Merchant & Gould P.C.

(57) ABSTRACT

Systems and methods for directing an alert to responders are provided. Upon activation of an alert application on a user device, an options screen is displayed to a user. The user can select a report option, and a screen is displayed for the user to enter information into one or more required and optional fields regarding a threat or a risk event. Once the system determines that the required fields have been filled, the system automatically composes a customized alert message based on the received information, automatically determines appropriate responders to notify. The customized alert message is transmitted to the determined responders, and acknowledgement messages are received from the responders.

20 Claims, 10 Drawing Sheets

(56) References Cited

U.S. PATENT DOCUMENTS

| | | | | |
|---|---|---|---|---|
| 10,762,769 | B1 * | 9/2020 | Sommerlatt | G08B 25/12 |
| 11,004,327 | B2 | 5/2021 | Beaver et al. | |
| 2003/0141971 | A1 * | 7/2003 | Heiken, Jr. | G08B 25/009 379/49 |
| 2014/0057590 | A1 * | 2/2014 | Romero | G08B 25/08 455/404.2 |
| 2015/0289121 | A1 | 10/2015 | Lesage et al. | |
| 2016/0037292 | A1 * | 2/2016 | King | G08B 25/016 455/404.2 |
| 2017/0229006 | A1 | 8/2017 | Tonna et al. | |
| 2019/0261154 | A1 | 8/2019 | Bohlander et al. | |
| 2020/0329358 | A1 * | 10/2020 | Hamre | H04W 4/90 |

* cited by examiner

FIGURE 5C
JURISDICTIONS FOR SELECTION
Mitchell - C
Winnebago - C
Worth - C
Forest City -S
Mason City - S

FIGURE 6
AVAILABLE RESOURCES
NEAREST POLICE DEPARTMENT
NEAREST FIRE STATION
NEAREST MEDICAL FACILITY
NEAREST VEHICLE REPAIR FACILITY
NEAREST VEHICLE TOWING SERVICE
False reports to or false communications with public safety entities can be a violation of law.

COMPOSING AND TRANSMITTING CUSTOMIZED ALERT MESSAGES TO RESPONDERS

CROSS-REFERENCE TO RELATED APPLICATIONS

This patent application is a continuation of U.S. application Ser. No. 17/025,291, filed Sep. 18, 2020 and assigned U.S. Pat. No. 11,004,327, which claims the benefit of U.S. Provisional Patent Application No. 62/902,147, filed Sep. 18, 2019, the contents of both applications are hereby incorporated by reference herein.

BACKGROUND

Persons, in the ordinary course of their daily lives, encounter problem situations in which they may feel a need for assistance from qualified responders. For example, people face natural challenges or disasters, such as hurricanes, tornados, blizzards, floods, and earthquakes. Manmade disasters can also cause a personal need for assistance, such as fires, witnessing or being a victim of a robbery or violence, an active shooter, a terrorist event, or a multi-vehicle accident. Further, individual challenges or injuries can cause a need for assistance, such as a heart attack, a fall, a broken bone, a serious laceration, an auto accident, a physical act, being a victim of terrorism, or becoming lost, just to name a few.

In the past, calls for assistance were made by shouting for help, running to the nearest house, or finding a working telephone. More recently, with the expanded distribution of increasingly technical communication devices, people have been able to make calls for assistance with portable phones or by emailing a friend or family member.

In spite of people's best intentions, many calls for assistance do not get made, are made to the wrong responders, encounter busy signals, fail in transmission, or convey wrong information. Additionally, people who encounter a disaster or need for assistance often do not know what type of responder to call, where to call, where the disaster or need for assistance is located, or what resources are needed. Further, the person attempting to contact responders may be a victim or may be in danger and lack the resources, time, or safety to make a complete call for assistance and answer questions regarding the disaster, the problem, or the danger.

What is needed is a reliable, easily utilized system whereby individuals can convey an alert message to one or more responders for assistance, where the system receives minimal information from the individual and conveys customized messages to qualified, nearby responders to alert the responders of a particular need for assistance at a particular location.

SUMMARY

This summary is provided to present a selection of concepts that are further described in greater detail below in the Detailed Description. This summary is not intended to identify important or required features of the claimed subject matter, nor is it intended to establish the scope of the claimed subject matter.

According to certain embodiments, a method is provided for directing an alert to responders, including displaying an options screen on a user device, the displayed options comprising one or more of report, resources, about us, and warning options. Upon receiving a selection of the report option, a warning screen is displayed on the user device. Upon receiving a decline selection or upon the passage of a predetermined amount of time since the warning screen was displayed, the display screen is cleared and the method ends. Upon determining that an acceptance of the warning has been selected, displaying an alert reporting screen and determining whether information has been received in the required fields of the alert reporting screen. Upon determining that information received for one or more required fields is not complete or is not correctly formatted, displaying instructions on the user device to fill or correct the necessary fields. Upon determining that all required information has been correctly received, automatically (i.e., without human intervention) composing one or more customized alert messages based on the received information; automatically transmitting the one or more of the customized alert messages to each of the one or more responders; and receiving, at a network server, one or more acknowledgement messages from the one or more responders.

Under a further embodiment, a method is provided for directing an alert message to one or more responders, including displaying an options screen on the user device, the displayed options comprising one or more of report, resources, about us, and warning options. Upon receiving a selection of the report option, displaying an alert reporting screen and determining whether alert information has been received in the required fields of the alert reporting screen. Upon determining that alert information received for one or more required fields is not complete, displaying instructions on the user device to fill or correct the necessary fields. Upon determining that all required information has been correctly received, automatically composing one or more customized alert messages based on the received information; and automatically transmitting the one or more of the customized alert messages to each of the one or more responders.

According to additional embodiments, a system for directing alert messages to responders is provided, the system including a processing device and computer readable data storage media storing instructions that, when executed by the processing device, cause the processing device to provide an alert messaging system. The alert messaging system is operative to display an options screen on the user device, the displayed options comprising one or more of report, resources, about us, and warning options. Upon receiving a selection of the report option, display an alert reporting screen and determine whether alert information has been received in the required fields of the alert reporting screen. Upon determining that alert information received for one or more required fields is not complete or is not correctly formatted, display instructions on the user device to fill or correct the necessary fields. Upon determining that all required information has been correctly received, automatically compose one or more customized alert messages based on the received information; and automatically transmit the one or more of the customized alert messages to each of the one or more responders.

An alternate embodiment provides a computer readable storage device including executable instructions for directing an alert message to responders, which when executed by a processor, is operable to display an options screen on the user device, the displayed options comprising one or more of report, resources, about us, and warning options. Upon receiving a selection of the report option, display an alert reporting screen and determine whether alert information has been received in the required fields of the alert reporting screen. Upon determining that alert information received for one or more required fields is not complete or is not correctly formatted, display instructions on the user device to fill or correct the necessary fields. Upon determining that all required information has been correctly received, automatically compose one or more customized alert messages based on the received information; and automatically transmit the one or more of the customized alert messages to each of the one or more responders.

The alert messaging system permits users in possession of a computing device having communications resources to report, in confidence, known or feared emergencies, threats, risks, or violence or suspected threats, risks, violence, acts of terrorism, or other events of concern. The system provides significant improvements over contemporary calls for help and technologies for alerting responders to mobilize for providing assistance. It presents a simple and reliable way for a user, particularly a user at risk or under stress, to connect to an appropriate responder and to indicate who is at risk, what is needed, and where assistance should be sent. Time is not lost waiting to connect to a busy 911 service, incorrect information is not conveyed because of a bad or noisy telephone connection, the user does not need to take time to compose a descriptive email or text message, and critical information is not missing because the user did not think to provide it. Acts of terrorism affecting one or many persons can be quickly, easily, and efficiently reported to responders for a rapid response, thereby countering the acts of terrorism by reducing the risk, injuries, violence, and damages caused by the terrorism. Further, multiple media pathways are automatically provided for the user to have her alert message transmitted to nearby, appropriate responders—thereby eliminating the burden from the user to determine how and to whom to direct a call for help and increasing the likelihood that her message will be received and an appropriate response will be dispatched.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The present invention has other features and advantages which will be apparent from or are set forth in more detail in the accompanying drawings, which are incorporated herein, and the following Detailed Description, which together serve to explain certain principles of the present invention and to enable a person of ordinary skill in the art to make and use the embodiments disclosed herein. In the drawings, like reference numbers indicate identical or functionally similar elements.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes can be determined in part by persons of ordinary skill in the art for the particular intended application and use environments.

DETAILED DESCRIPTION

Figure 1:
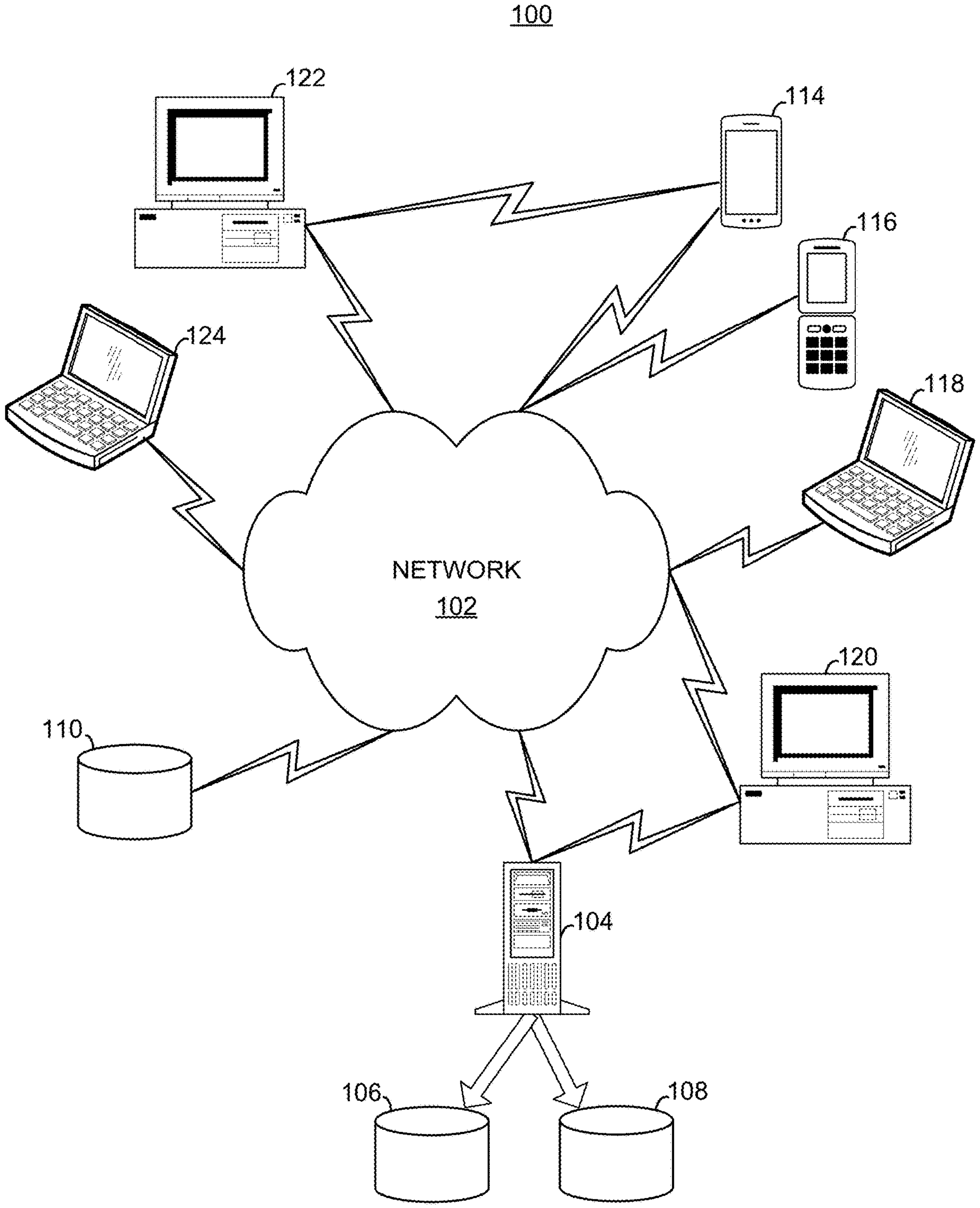
FIG. 1 illustrates an example architecture of a network for implementing a method for directing an alert to responders.

Although the described embodiments can be implemented in any appropriate type of network system supporting any suitable communication standards and using any suitable components, particular embodiments can be implemented in an exemplary network such as shown in FIG. 1.

Referring first to FIG. 1, there is shown an exemplary architecture of a network and alert messaging system 100 for implementing a method for directing an alert from a user to one or more responders. The network 102 across which communications in exemplary embodiments occur, can include any private or public, wired or wireless network, including but not limited to Local Area Networks, Wide Area Networks, the Internet, the World Wide Web, radio frequency (RF), Bluetooth, and a Cloud-based network. There is shown an exemplary central network server 104 and one or more databases and/or storage devices 106 and 108. There may be more servers, more databases, and more storage devices 110 than those displayed in FIG. 1, with the servers minimally configured with memory, at least one processor or processing device, communication resources, and with the databases being external to or integrated with the servers. Regional and central network servers will be collectively referred to as the network server 104 or the regional and/or central network servers 104. There are one or more user devices 114-120 for utilizing the alert messaging system and for the alert messaging system 100 to access, display or view objects, receive information, enter information, and communicate information and messages. Users and user devices are collectively represented as a smart phone 114. The system 100 can effect the customization, building, and transmission of alert messages from users of portable devices 114 to responder devices 122, 124 through the network server 104 and network 102. The alert messaging system 100 extends to software, programs, and routines within storage media on each of the user devices, responder devices, and servers.

The user devices 114 for initiating alert messages to one or more responders are representatively shown as a smart phone 114, a cell phone 116, a portable tablet or laptop computer 118, and a desktop computer 120. Examples of user devices 114 include, but are not limited to, wireless user equipment and communication devices, such as, for example, mobile telephones, smart phones, personal digital assistants, electronic readers, portable electronic tablets, personal computers, and laptop computers. Each representative user device 114 minimally comprises a processor or processing device, a memory coupled to the processor, a display coupled to the processor, computer readable media, facilities for entering information into the user device 114, and an antenna or other wired or wireless connection device coupled to the processor for receiving and transmitting information, messages, and/or commands or instructions. The display can include touch screen technology for the entry of user information required by the alert system and information related to the location and type of event causing the need for assistance. The information can be entered, for example and not limitation, in text form or by touching action buttons displayed on the screen or integrated with the body of the user device 114. Alternately, user entry of information and reactions can be through use of a physical or touch screen keyboard or by voice.

The system is envisioned to be encoded into an application loaded onto a user's device 114 for access by the user as a need may arise. Each user can download the application from an app store if the application is not already preloaded on the user's device 114. In view of the many school-age children being provided computers by their respective school systems, the alert messaging application can be downloaded onto the computers prior to the computers being given to the individual students. Under such circumstances, standard or default information can be set up within each such application, providing for a list of responders information to whom alert messages are to be directed, including the school administration or the school's counselor office.

The alert messaging system 100 also includes one or more responder devices 122, 124 for receiving alert messages from the alert messaging system over the network 102 and the network server 104. Responders are collectively represented as a computer 122. The responder devices 122 can be any type of computing device having communications and display facilities in the same manner of the user devices 114. One to many responders are in communication with the system 100 and can communicate from a plurality of different devices and via a plurality of different communication protocols, as described above regarding the remote user device 114. While FIG. 1 shows all communications being directed to the network server 104, exemplary embodiments are not so limited; and communications can be provided directly through the network 102 for the user devices 114 and the responders 122. Alternately, communications can be provided directly between a remote user device and one or more responders as shown between user device 114 and responder device 122.

Exemplary embodiments are implemented on the computers of the user devices 114 and the responder devices 122 and, alternately the network server 104. Computer executable instructions, or software, are provided for directing the processing of the computers of the exemplary devices 114, 122, and 104, including processing the steps of exemplary embodiments of the alert messaging system 100. The computer executable instructions, when executed by the computers 114, 122, and 104 and/or the processors associated with each of said computers, provide for the presentation of images and selection options to the user devices 114 upon initiation of an alert messaging application by users of the devices 114 and for transmission of alert messages to responders.

One or more storage devices 106, 108, and 110 are provided for storage of information regarding resources available for composing and responding to alert messages. This information includes, but is not limited to, names of responders (including their location, their contact information, the geographic area they cover, the response resources they can provide, the type of alerts to which they can respond, the type of equipment and expertise they have available), the statutory code sections for warning users to not misuse the alert messaging system, and a plurality of alert reporting templates for presentation to users of the system for guiding the entry of event information for transmission to responders and advising the responders of an alert. The system is configured to secure this information for privacy concerns as discussed more thoroughly below.

Computer readable media includes computer storage media, which includes volatile and non-volatile media, removable and non-removable media implemented in any method or technology for the storage of information, including computer readable instructions, data structures, display templates, and responder information. Computer storage media includes, but is not limited to magnetic media (e.g., a hard disk), non-transitory memory, optical media (e.g., a DVD), memory devices (e.g., random access memory), and the like. In some embodiments, computer readable instructions are configured such that, when executed by a processor and/or a processing device, the instructions cause the exemplary computers 114, 122, and 104 to perform steps described below of the alert messaging system (e.g., steps described below with reference to the flow chart shown at least in FIG. 2). In other embodiments, the exemplary computers 114, 122, and 104 are configured to perform steps described below without the need for software instructions. Therefore, the features of the present embodiments described herein may be implemented in any suitable combination of hardware and/or software. Computer storage media does not include a carrier wave or any other propagated data signal.

Exemplary embodiments provide an improved method and system for alerting responders of a need to provide help. The disclosed system provides automated signals, messages, and transmissions to nearby responders of a need to provide aid to one or more individuals at a particular, identified location. As such, the system provides significant, potentially life-saving benefits over existing alerting systems by, for example, avoiding busy telephone systems, alerting systems sending responders to the wrong location, and injured individuals being unable to convey sufficient information so responders know where to respond and with what particular resources.

Figure 2:
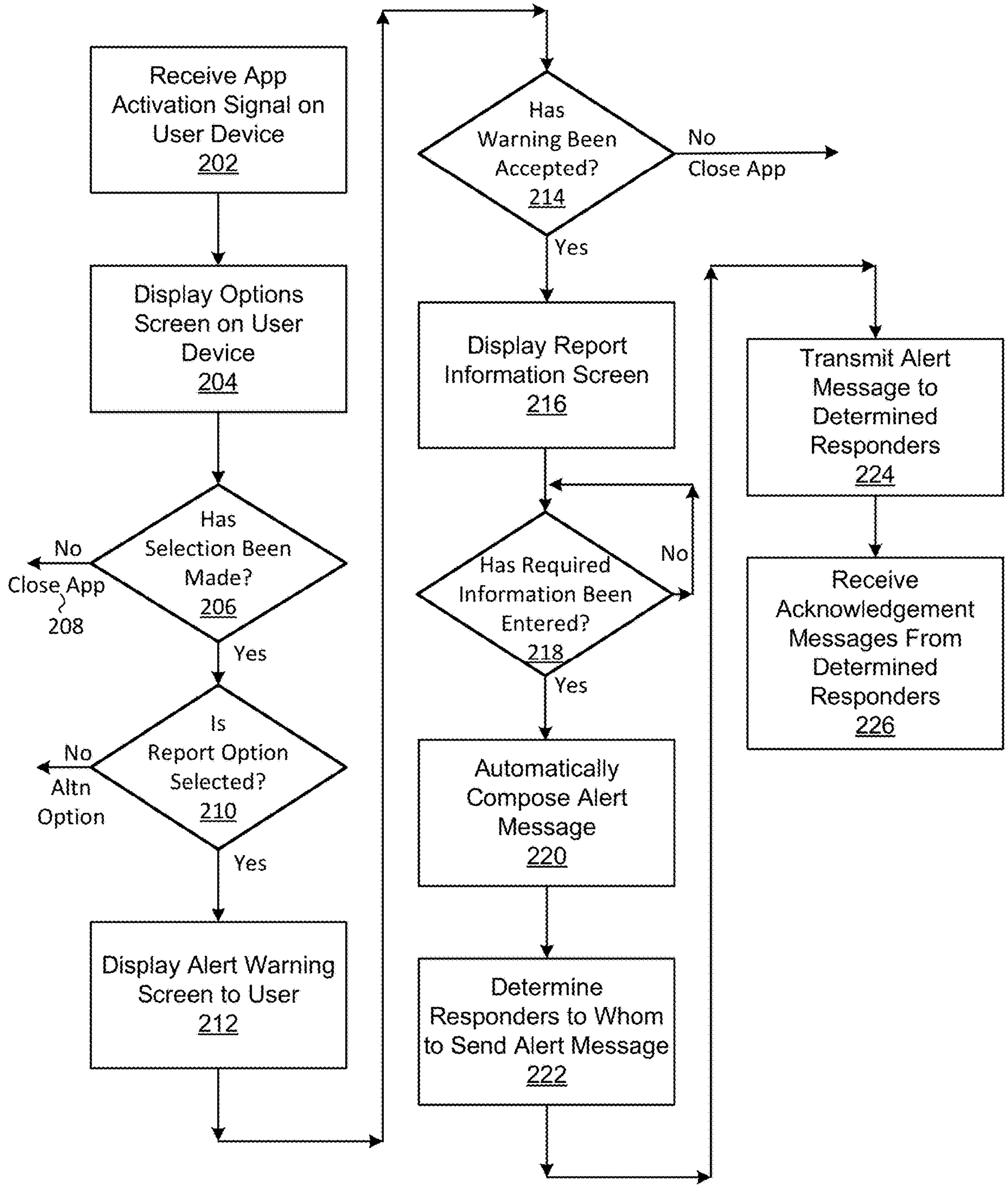
FIG. 2 is a flowchart illustrating the steps for composing and transmitting an alert message to responders.

Referring now to FIG. 2, there is shown a flowchart of a method for composing and directing an alert to responders in accordance with exemplary embodiments of the present invention. The present invention provides a method for composing and transmitting an alert message from a user to one or more responders such that the message is customized based on the event, the perceived needs of the user, the location of the user, and the location and resources of the responder. Hereinafter, the steps of this method will be described in detail.

Figure 3:
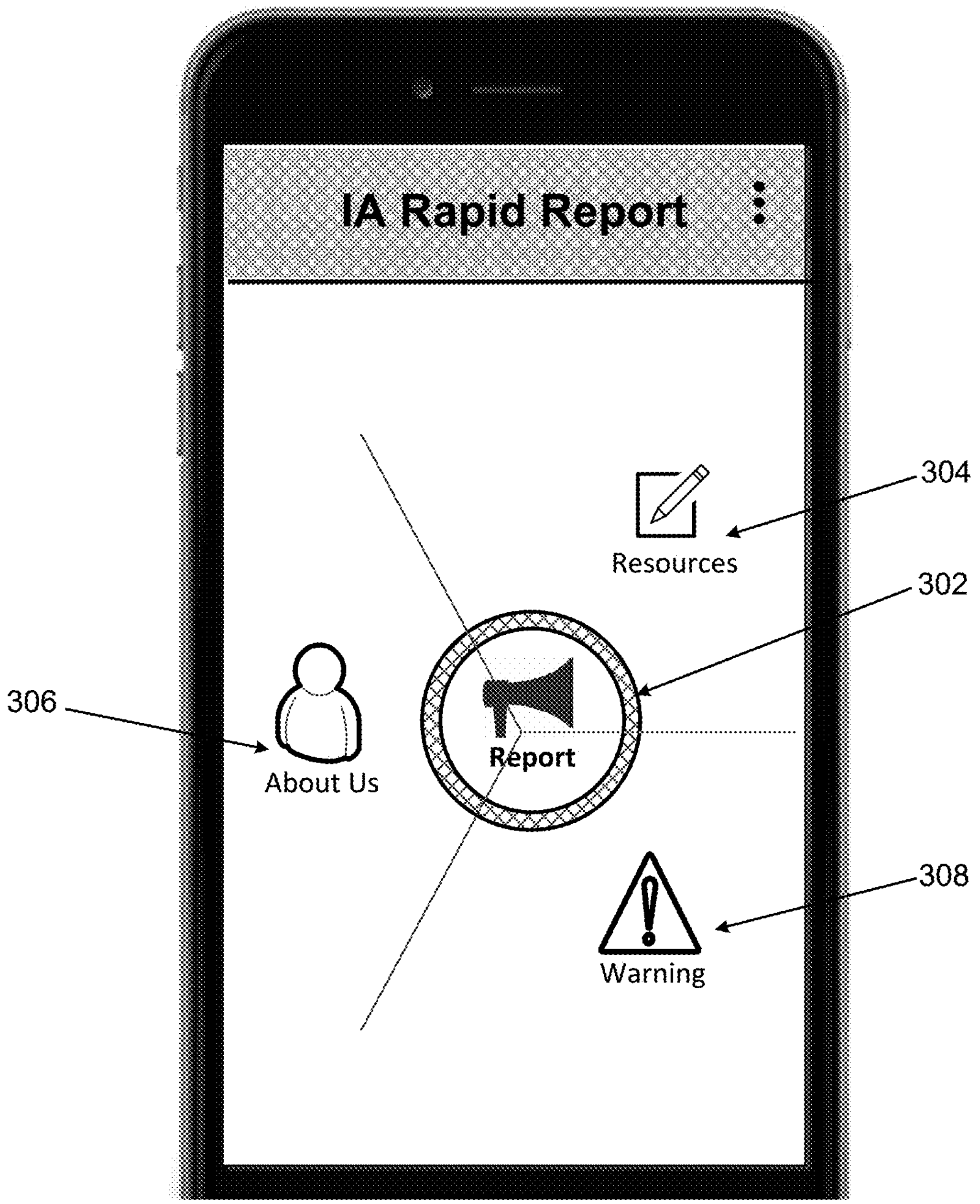
FIG. 3 illustrates an options display screen once the alert system has been activated or invoked, showing the options available for the user to select.

Upon encountering a situation in which a user of a user device believes or considers that assistance from a responder is needed, the user can activate an application on her user device 114 at operation 202 to initiate the steps and resources of the subject matter disclosed in this specification. Upon activating the application, an options screen is displayed to the user on the user device 114 at operation 204, showing the various options that can be selected. An exemplary options screen is shown in FIG. 3. For example, but not limited to, the screen can display a report option 302, a resources option 304, an about us option 306, or a warning option 308.

Figure 4:
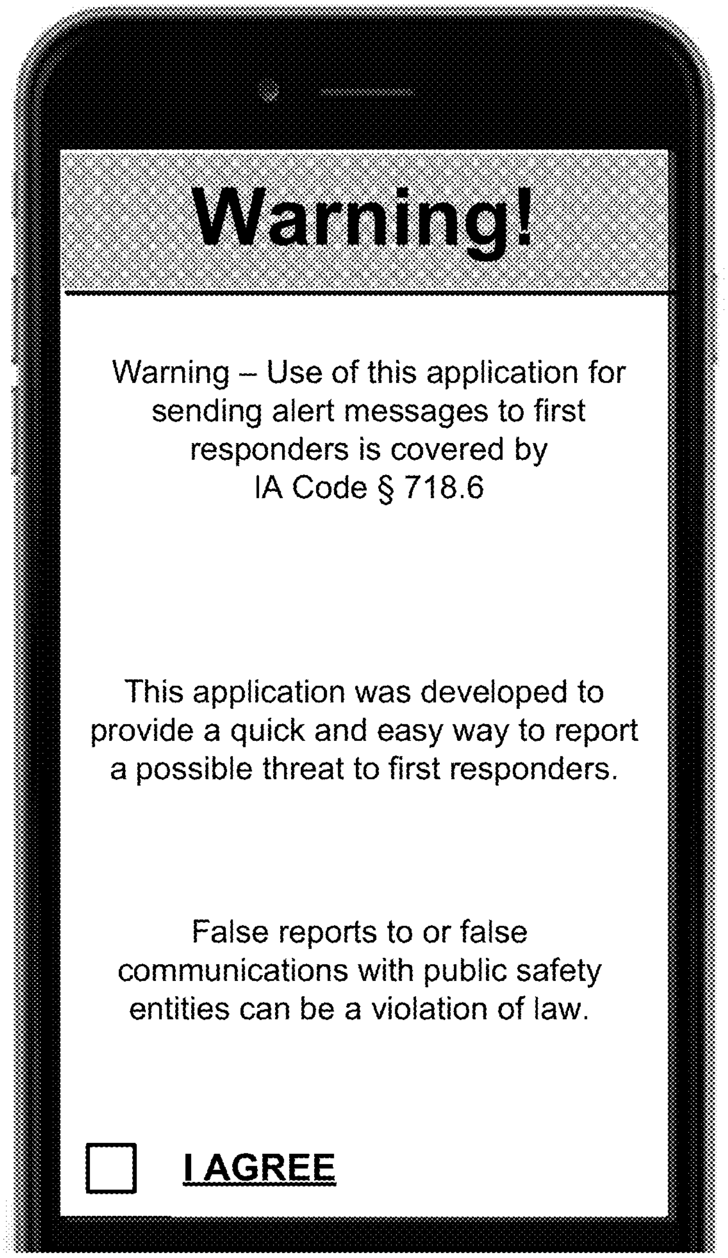
FIG. 4 illustrates a warning screen to the user advising that there are consequences for misusing the system.
Figure 5A:
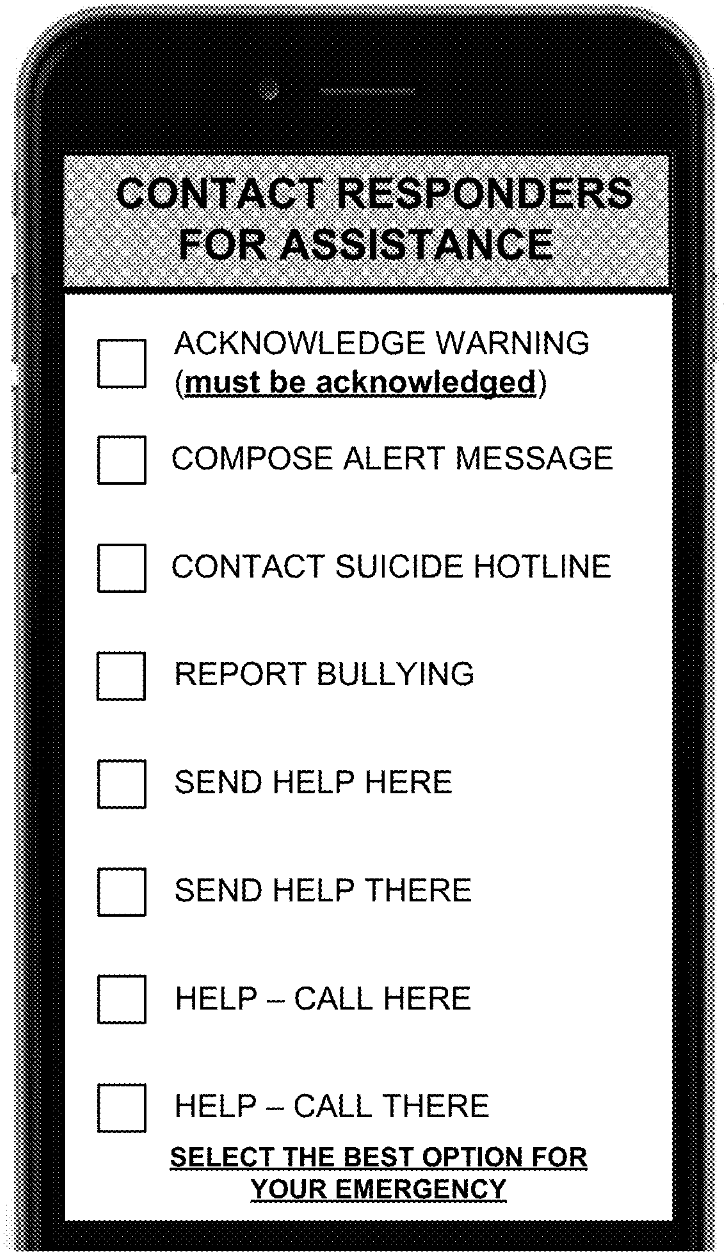
FIG. 5A illustrate an exemplary alert report selection screen for selecting an alert to be transmitted to a responder.

If a selection of an option is not made at operation 206 in a finite period of time, for example a minute, the system instructs the user device 114 to remove the options display from the screen and to close the application on the user device at operation 208. Such a first threshold time and further threshold times discussed here and below can be stored within the storage of the user device and/or the network server 104 and are not modifiable by the user. Upon receiving a selection of the report option 302 on the user device at operation 210, the system displays an alert report selection screen on the user device, as shown in FIG. 5A. The user must first click on the Acknowledge Warning option on the selection screen to agree to comply with the warning. Selecting any other option on the display screen of FIG. 5A will generate an error tone and redisplay the screen of FIG. 5A. Upon clicking or entering the Acknowledge Warning option, the user device displays a warning screen as shown in FIG. 4 at operation 212. The warning screen cautions the user that the application is not to be misused, nor used casually, indiscriminately, as a game or hoax, or used to falsely report a threat. The warning screen can also include a statute reference that is relevant to misuse of the alert messaging system. As will be discussed in more detail below, the system is interested in and acquires location information of the user, the event, and the possible responders. The system determines among these locations the appropriate statute cite(s) to list, such as a cite for the statute applicable to the user's location and the statute applicable to the responder's location. These statute citations can be stored on the network server 104 and transmitted upon activation of the alert application and/or can be stored within the user device and periodically updated. Preferably, statute and responder information are stored on the network server 104 rather than on user devices for ease, timeliness, and consistency of maintenance.

Figure 5B:
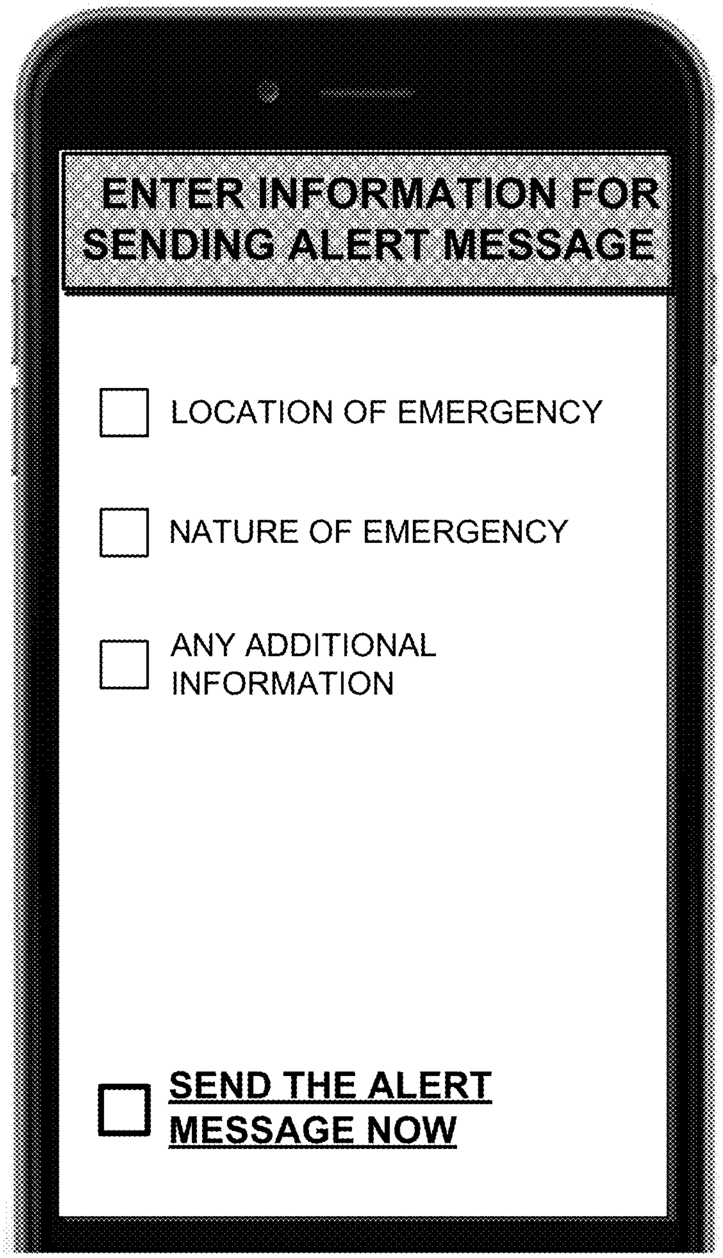
FIG. 5B illustrates an exemplary alert composition screen for entering information for composing an alert message for transmission to one or more responders.

The user must respond to the displayed warning by indicating she agrees to comply with the warning. Otherwise, the system will not proceed, and after a predetermined second threshold amount of time will close the application. Upon receiving a response at operation 214 that the user has agreed to comply with the warning terms, the report alert selection screen is redisplayed to the user at operation 216 so that the alert can be composed and the event can be reported. Preferably, the acknowledge warning option can be removed from this redisplay of the selection screen to avoid confusion that the warning must still be acknowledged. If the user needs to compose an alert message by providing a description of the event of concern or emergency, she can enter the "Compose Alert Message," which then causes the alert composition screen of FIG. 5B to be displayed. The alert composition screen display is dynamic in that it will change and will present different fields for the entry of information based on the user's input. For example, if the user enters a threat of a tornado and indicates the location (such as her location), the system has sufficient information to proceed and will display an instruction that the user can now send the alert message. Alternatively, if the user is reporting suspicious activity, the system will request a minimal narrative to describe the activity. Each particular threat, issue, or emergency has specific information that is needed for the system to compose a complete and useful alert message and to determine to which responders to transmit the alert message. These information fields can be marked as mandatory or optional (not shown in FIG. 5B). For example, the location of emergency can be optional if the emergency event is at the location of the user device, because the GPS capability of the user device will be accessed while the alert message is being composed by the system to provide the needed location information in the alert message. If any information is needed but missing, the system will recognize the deficiency and present a message on the screen of the user device asking for the missing information.

It should be understood that a goal of the alert messaging system is to provide a user a method and system for simply, easily, and quickly composing and transmitting an alert message to an appropriate responder, an appropriate responder being a nearby responder with the resources to provide required assistance to address the emergency event. Accordingly, there will be events where time is of the essence and only the warning screen will require a mandatory response for the system to proceed with composing and transmitting an alert message. Similarly, the system can proceed with minimal information if the user must merely transmit an alert without taking time for providing additional details. Under such circumstances, the system will transmit an alert message utilizing the user device's global positioning system (GPS) location information to nearby first responders, such as police, fire, and medical responders. Again, under the principle of encouraging rapid and accurate reporting of events, the user has the option of entering identity information, such as, for example, name, address, email address, and/or phone number. However, under a concern for privacy, as discussed below, such identity information is not mandatory. An optional field may permit the user to upload one or more pictures relevant to the threat or event.

Once all the mandatory fields are entered at operation 218, the system can either ask the user if she is finished; or the user can enter the "Send" option. If she responds yes to such an inquiry or enters the "Send" option, the system composes the alert message at operation 220, determines at operation 222 the responders to which to send the message, and transmits at operation 224 the message to each of the determined responders according to transmission means and addresses previously established by the responders. For example, if a responder has registered with the alert messaging system that it can receive alerts by phone, text, email, and social media, the system will compose an alert message and transmit the message to that responder by means of each of those media communication types.

The determination of appropriate responders is accomplished by accessing one or more files containing responder information, including location, geographic coverage, resources, and expertise. This responder information is designed to be located and maintained on the network server 104, but under some circumstances can be stored and maintained on user devices 114. The system determines the nature of the emergency event as provided by the user and the location of the event, either from information provided by the user or from the GPS location data of the user's device 114. From this event and location information, the system can query the stored responder information to determine nearby responders (such as those within 10 miles of the event) with the resources (to respond to a fire, for example) for responding to the event. Additional responders can also be included for receiving the alert message. Since fire events often require traffic control and medical assistance, the determination of appropriate responders can include the police and medical personnel. Further, certain emergencies may justify the involvement of specialized or centralized responders. Accordingly, responders or administrators in a given jurisdiction, business, school system, and the like may determine they should be contacted even if located relatively far from an event. Under these circumstances, for example, central state patrol and medical resources can be included in the list of determined responders for notification of certain events, such as a hurricane, a tornado, or a terrorist event. In this manner, both local and central responders would be aware of a need to respond to a serious emergency event that could require more than a local response.

One principle behind the system is to simplify the entry and transmission of information to appropriate responders and to ensure that at least one message is received by each of the determined responders by means of the responders' designated communication types. For example, response time is lost if fire personnel are sent a fight threat, when the police should be dispatched. Accordingly, the system will attempt to determine from the information entered by the user and the reporting options selected by the user the nature of the event being reported for which assistance is being requested. The system will utilize this information to not only determine the appropriate responders (based on such information as responder location, resources, and expertise) to contact but also to compose the message to the responders informing them the nature or type of event to which they will be responding. This selection of appropriate responders and composition of an alert message based on information about the user device location and user-entered information can be performed through artificial intelligence or matching algorithms between the user device/entered information and responder resources and locations. For example, if the threat is within a school, based on user input or GPS information, school administrators can be among the responders receiving an alert message; and the message can pinpoint within the building where the threat is located (a fight in the gym, an experiment gone wrong in the chemistry lab, an injury on the practice field). For example, the alert message can state, "A fight has been reported at 2:15 pm, September 20 in the South Gym of Lincoln School in Gibbson, Iowa," with the date and time being the date and time the alert message was transmitted (such information is included in the message). Further, minimal entries are preferred, and the entries are accepted as entered and are not checked for spelling, grammar, or capitalization. In an alternate embodiment, recognizing that emergencies can be stressful and time may be of the essence, the mandatory information, including responding to the warning screen, can be bypassed for the user to initiate transmission of the alert message as quickly as possible. In the absence of any mandatory information, the alert message system can proceed with minimal information, such as described below, with the "SEND HELP HERE," SEND HELP THERE," "HELP—CALL HERE," "HELP—CALL THERE" selectable options.

By intelligently directing alert messages to the best relevant responders, the alert system provides a significant improvement over the existing technology and functionality being utilized in contemporary alert systems and 911 call systems by automatically alerting the most appropriate responders for the emergency and the location. Further, by automatically and simultaneously transmitting alert messages across a plurality of media to a plurality of responders, the system is not limited by an overloaded or unresponsive 911 call system, by some responder systems being offline, or by an operator misunderstanding the emergency or the location. Additionally, the user need not know her current location to transmit a message indicating a need for assistance at her location, nor does she need to know how to contact local, relevant responders for her current concern or emergency. Alert messages are received by one or more responders in real time across multiple resources. The messages are displayed on the responders' devices for answer and/or response and can trigger an audible or vibration effect on the responders' devices to alert them of a received alert message. Accordingly, for example, a responder whose phone system or cell system is down can still receive the alert message through its email messaging system or social media. Further, if alert messages are received at the wrong location (even if received at a common central dispatch center), a responder can quickly and effectively forward the messages to the appropriate responders without having to call those possible multiple responders, wait for the phones to be answered, and verbally convey the alert message information.

If the user is not finished entering optional information, she can continue entering information and hit the send button when she is finished. If the system detects passage of a third threshold amount of time without any further entry of information, the system will present a query to the user on the display of the user device 114, asking if she is finished. If she responds, yes, the system composes and transmits the alert message. If she responds, no, or fails to respond, the system will provide an additional, fourth threshold of time for her to complete entering information before closing down the application.

The user can indicate her identity, or the message can be sent anonymously. This feature facilitates the transmission of critical information, which is often more valuable than the identity of the person initiating the alert. Further, sending a message anonymously can be less intimidating and can bypass the concern that the threat might not be real (i.e., the user was mistaken regarding the threat) or that the user might be retaliated against or does not want to get involved. However, the system may record such information as IP address of a user device, location of the user device, date and time the application was opened, a copy of the transmitted alert message, addresses to which the alert message was transmitted, and date and time of the transmission for storage on the network server 104 should it later be determined that the alert messaging system was misused or for analyzing alert messaging usage or emergency event occurrences.

Location of the alert event and/or location of the user can be critical to dispatching the best possible responders to an event. While the alert composition display screen can ask for the location of the user and/or the location of the event (such as address or location description), the screen can also present the option of the user being able to merely click on "here" to designate the event is at her location. Global positioning system resources (GPS) can be incorporated in the user devices 114, data from which can be detected by the alert messaging system. If GPS capabilities are present in the user device, the system will determine the user's location and include it in the alert message unless overridden by user input. If the GPS resources are not available, the "here" option is not displayed; and location information is required to be entered, with the user being so prompted if she does not input location information prior to entering "Send." Alternately, the user can enter a non-local location if the event is occurring or will occur at another location. Based on the type of event entered and the location of the event and/or the user, the system will determine the best responders to alert based on responder resources, expertise, and location and will transmit the alert message to them. For example, the system can determine, based on the stored responder information, the expertise of the various responders, the resources the responders have, and the geographic coverage of each responder. Based on this information, the system automatically determines which responders to contact and composes an alert message customized to the particular event, user-entered information, location of the event, the determined responders, and the date and time of the event and automatically transmits a customized alert to each determined responder, communicating the nature, location, the date and time of the event, resources needed, and any additional information that may guide or assist the responders to transport themselves to the event with appropriate personnel and equipment. The alert message can be transmitted as an email, a text message, a telephone call or voice message, a social media message or any other type of communication (including multiple messaging types to a responder) as selected by each responder during a registration process.

Optionally, the responders can respond to the system after receiving an alert message, by sending an acknowledgement of the received message and whether and when they are responding. Further, the system can optionally transmit a message to the user, notifying her of receipt of the alert message, when a response is being dispatched, and which agency is responding. Such a responding message can be comforting to the user, let her know the help is on the way, and permit her to focus on the emergency at hand, including her own safety.

If an acknowledgement is not received at operation 226 within a fifth threshold of time, or if the responder advises they can not respond or cannot respond timely, the system has the option of transmitting the alert to another responder as a replacement. As can be understood, the replacement responder may not be as desirable as the non-responding or unavailable responder in that they may be farther away or have fewer relevant resources. Each responder is responsible for keeping their information current within the system regarding their location, contact information, capabilities, and resources.

Referring again to FIG. 5A, a suicide help option can be displayed on the alert report selection screen for selection, whereby, upon hitting a suicide help button, the user would automatically be asked if she wants to call the suicide hotline (not shown). If the user responds, yes, by hitting a corresponding button, the system automatically initiates a call and connects her to the hotline associated with the nearest suicide counselor connected to a suicide hotline. The "call" can be a telephone call, a text message, an email message, a social media message or a combination of the four to a suicide counselor or responder. By transmitting a social media message, the system can transmit over and to known social media, such as, for example, Twitter, Instagram, Facebook, and Youtube, as a means of communicating to responders. As backup, the system can also transmit an alert to local police and medical responders for notification. Optionally, if there is no response from the suicide hotline within a sixth threshold of time, the system can take one of two options. First, the system can automatically end the first call and initiate a call to the next nearest counselor, while displaying a message on the user device 114 that another counselor is being called. Alternately, the system can first display on the user device 114 a notice that the first call is not being answered and ask the user whether the system should initiate a second call to a different counselor. By including a suicide help option within the alert messaging system, users will be provided significant benefits over conventional 911 call systems and even the recently-announce Federal Communications Commission 988 suicide prevention hotline. The alert system can provide a one-button (the second, "yes" button can be eliminated so that a single button entry automatically triggers transmission of the suicide hotline alert contact) method of contacting the nearest suicide hotline location, and provides for automatically calling a second, and more, suicide hotline if the first hotline does not timely respond. Further, by sending multiple media messages, such as a telephone call, a text message, an email message, and a social media message, the system is not limited to having a suicide counselor or operator available—a known limitation of current 911 systems.

Similarly, a "BULLYING" option shown on the alert report selection screen of FIG. 5A can be displayed to the user for selection. By hitting this button or icon, the user will be prompted to enter information describing the situation, such as who is being bullied by whom and where and when. After completion of the needed information, and upon hitting the send button, the system composes and transmits "BULLYING" alert messages to the appropriate responders. Since much bullying is associated with student relationships, one responder to which the alert message can be sent is the school administration or the school counselor's office nearest the user's device location or the user's entered location.

In an exemplary embodiment, the alert messaging system can display one or more icons or selectable options on the options screen for simplified user selection and automated composition and transmission of alert messages. For example, one or more of "SEND HELP HERE," SEND HELP THERE," "HELP—CALL HERE," "HELP—CALL THERE" options or icons can be displayed to the user on the alert report selection screen of FIG. 5A of the alert messaging system. These options can provide one-click or minimal entry requirements for transmitting requests to send help or for responders to call to provide help or assistance. For example, a user selecting "SEND HELP HERE" would automatically, without further human intervention, transmit messages to nearby responders, advising the responders that help needs to be sent to the user's location. Selection of "SEND HELP THERE" performs similarly, except the user device's screen would first display a free-format entry screen for entering location information to where the responders should go to provide assistance. Upon completion of the location information and hitting a send button or icon, the alert message, including the entered location information, would be transmitted to the responders near the entered location for them to be alerted and be requested to travel to the entered location to provide assistance. Such a feature would be helpful, for example, if a family member received a call that another family member was just involved in an accident and was unable to call for help. In such a situation, the family member could transmit the alert message, advising the responders where to go. For example, if a responder has registered with the alert messaging system that it can receive alerts by phone, text, email, and social media, the system will compose an alert message and transmit the message to that responder by means of each of those media communication types. As an additional feature, the system could analyze the provided location information and transmit an alert to responders near the location, thereby avoiding the responders near the family member's location from needing to forward the alert message to responders near the entered emergency location site.

The "HELP—CALL HERE" and "HELP—CALL THERE" options provide similar automated transmission of an alert message. However, instead of the responders traveling to the user's location or to a user-entered location, the responders would call the user or contact the user-entered telephone number or address. "Call" can include contacting the user-entered address information by text, email, or social media. Such an option provides verbal or electronic assistance when the physical presence of a responder is not necessarily needed or when the nature of the needed response is not known.

Figure 5C:
FIG. 5C illustrates an exemplary jurisdiction selection screen for selecting the jurisdiction in which the emergency event is occurring or will occur.

FIG. 5C shows a jurisdictional screen display presenting various jurisdictions that have the alert messaging system active and are available for responding to an alert message. The user can select the appropriate jurisdiction where she is located or where the event is occurring or will occur as an alternative to the system determining either a user or event location or determining which responders to which to transmit an alert message. For example, if the user selects Mitchell on FIG. 5C, the system will alert responders located in and near Mitchell County, Iowa. Each jurisdiction can customize a report screen to the user, based on the location of the user or the jurisdiction selected by the user.

In an alternate embodiment, the alert messaging system can push alerts to the user devices, based in part on the location of each user device, to alert the user of a potential threat, hazard, risk, or emergency near each user's location, either current or anticipated. For example, an alert regarding the sighting of a tornado can be transmitted to users whose GPS information on their devices indicate they are in the path of a sighted tornado. An alert can be sent to users whose GPS information shows they are located downwind from a train derailment that is leaking toxic fumes. An alert can be sent to users located in a hotel that is on fire and whose fire alarm and/or sprinkler systems have failed. Such alerts can be initiated by the area responders to whom the system would normally be receiving alert messages from the users in the area or by administrators having access to the network server 104.

Figure 6:
FIG. 6 illustrates the resources available to the user.

If the user selects the resources option instead of the report option on the options display screen of FIG. 3, the exemplary resources display of FIG. 6 is shown to the user. The displayed resources provide alternate sources of assistance on which the user can click and be connected to in an expedited manner. At each such resource, a receiving device, like the responder devices, can recognize the connection or message from the user device as being associated with the alert messaging system and can provide an expedited response. As can be seen in FIG. 6, this screen may also display the warning that the system is to be used responsibly and for its purpose of alerting a threat of an event of concern. Unlike other aspects of the alert messaging system, the user can update the categories of resources listed as available resources; and the system will determine the appropriate responders to which to send messages based on the resources information provided by the responders and stored at the network server 104.

Figure 7:
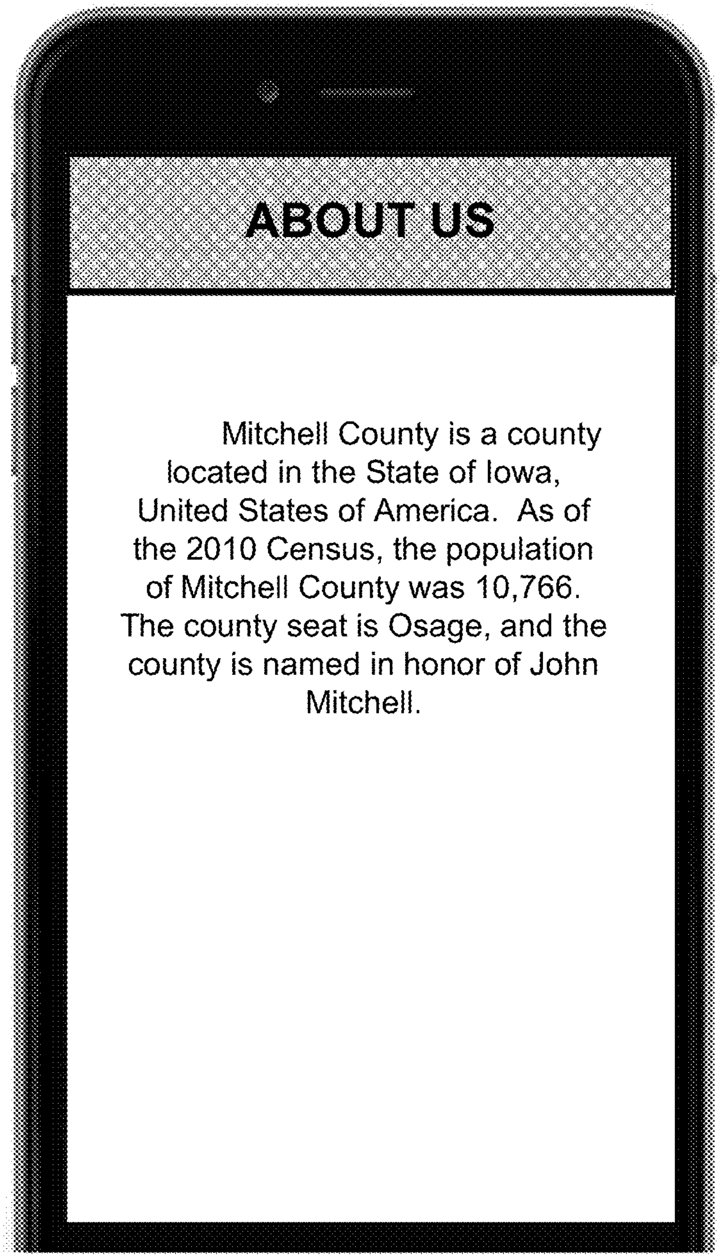
FIG. 7 illustrates a screen displaying information about us, such as a jurisdiction sponsoring the alert messaging system.

If the user selects the about us option from the options display screen of FIG. 3, the display of FIG. 7 is shown to the user. The displayed information can include, but is not limited to, information about the system, information about local responders, information about responders at a non-local event location, and information about the local or selected jurisdiction.

Figure 8:
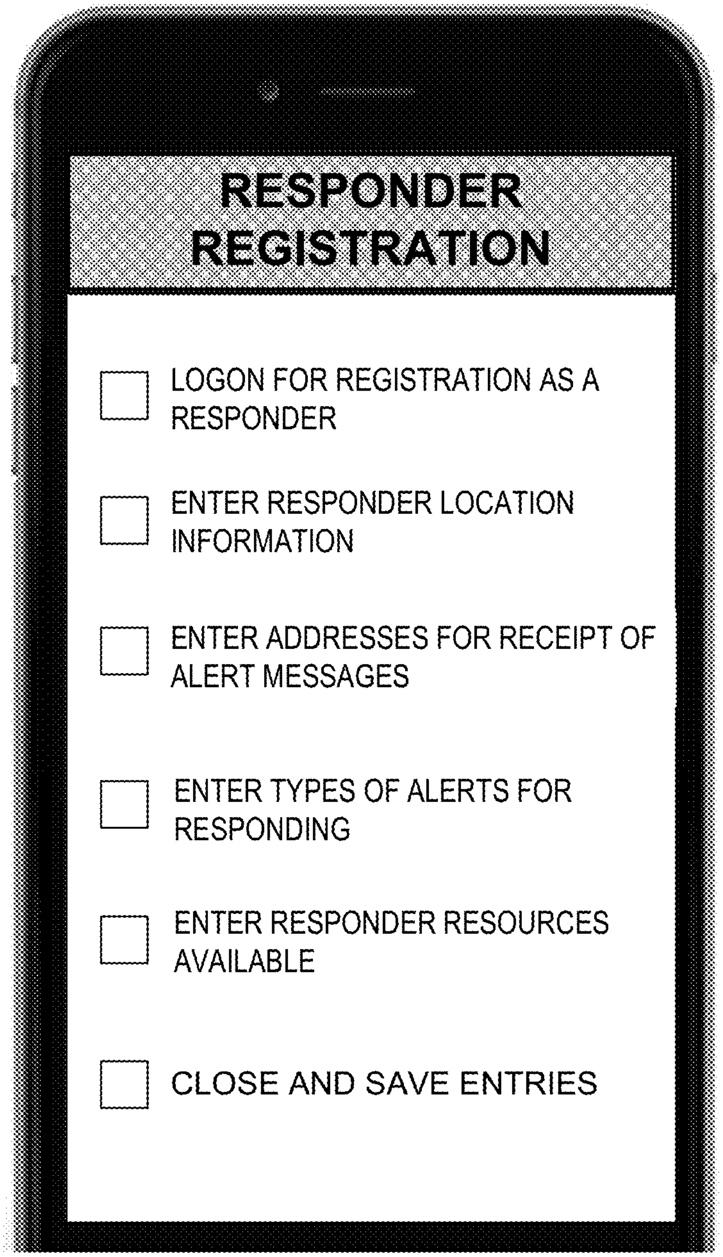
FIG. 8 illustrates a screen for responders to register their information on the alert messaging system.

Referring now to FIG. 8, responders desiring to be included in the alert messaging system can access the system and enter their contact information to become registered within the alert messaging system and thereby known to the system to which to transmit alert messages. Alternately, responders can be asked to participate in the system and, if they agree, they can enter their contact information into the system. For example, a school district may want all of their students to have access to the alert messaging system, and the school administration contacts the area responders and request they provide their contact information for the system. Upon receiving a request by a potential responder to register with the alert messaging system, they system will review the information provide in the request regarding the qualifications and status of the potential responder. If the potential responder qualifies to be included in the alert messaging system (such as being a recognized, certified, and authorized medical resource, for example), the system will transmit authentication information to the responder, such as a logon identifier, a password, and/or a registration number. Upon accessing the system for registration, a responder will be asked to provide logon information for authenticated access to the system, as shown in FIG. 8. Upon authentication, the responder will be returned to the screen shown in FIG. 8 and enter all relevant responder information for receiving alert messages. This information includes location information regarding the location from which the responder will be dispatched to the alert event location and possibly geographic information for which the responder can cover. The responder will also enter resource information, such as the type or nature of services it can provide, such as fire abatement, policing services, medical services, vehicle accident response services, boating or drowning response services, and search and rescue services. Resource information can also include the staff the responder has available, their expertise, and the equipment the responder has available to dispatch in response to an alert message. The responder will provide the various addresses through which it can receive alert messages, such as by email, text messages, telephone call or voice message, social media message or any other type of communication (including multiple messaging types to a responder). While FIG. 8 shows only one entry line per media communication type, the responder can enter multiple addresses, such as multiple email addresses. Upon receiving the responder information, the alert messaging system will determine whether the information is complete. If the responder information is not complete, the system will so notify the responder to provide the missing information. Under some circumstances the responder will not be registered in the alert messaging system if particular, necessary information (such as location and expertise) is not provided. The responder information will be stored on the network server 104 and can be updated by the responders upon authenticated access.

Personal privacy and the need to capture information related to emergencies and responses to emergencies can conflict at times. For example, the system will receive, determine, or calculate a user's location and can optionally store that information at a central site. In contrast, many persons normally block applications from determining and/or storing location information associated with that user. However, there are times and circumstances where accessing and even storing location information is critical to assisting people. For example, responders can be dispatched to a certain location to provide assistance based on the receipt of an alert message; and, upon arriving at the designated location, cannot find anyone needing assistance. By being able to query the alert message information, which has been stored, the responders can verify whether their dispatched site address is correct. Further, by storing alert message information, subsequent queries of the information can be valuable to review and analyze response times, efforts, and resources to learn how to respond to such alerts faster and more efficiently. For example, three fire companies may be an excessive allocation of resources to a simple garage fire. By analyzing such stored alert and response data, the alert system, the listing of responders to be contacted and dispatched, and each responder's procedures can be updated and fine-tuned so sufficient, but not excessive, resources are directed to respond to particular alert messages. In the same regard, trends can be determined from the accumulated stored alert message information to identify, for example, locations having an increasing number of alert issues, locations needing updated or specialized response resources, and locations having fewer emergencies. Additionally, the system can summarize alert information and provide follow-up summaries to determine how effective the alert system is in responding to and reducing the number of emergencies, suicides, bullying, and the like.

Also, by storing information related to a user and/or alert messages, the system can track a user under the circumstances that the user appears to be, or is known to be, missing. Under such circumstances, a higher level of authentication will be required to remotely access a user's device and track the location of the device, or even wake the device up to receive calls, text messages, emails, or social media messages.

On the negative side, however, to help ensure the effectiveness of the alert system and to avoid sending responders to fake emergencies, it is important to identify and discourage persons who abuse the system by initiating false or excessive alerts or who direct responders to a false address. Data from these alert messages can identify the user and/or location of the user abusing the system for remedial action. Accordingly, the system provides for storage of all information and data related to an alert message, including the identity of the user or the user's device initiating the message, the location of the user, any differing location information provided in the message, the text of any message input by the user, the alert options selected by the user, and detailed response information. The response information can include the identities of all responders or responding agencies, when the message was received, when the responders were dispatched, when the responders returned to the station, and a summary of what occurred during the response. This information can be temporarily stored locally at a responder's station but ultimately is stored at a regional and/or central site and removed from the local station. The information is secured at all sites by security and authentication protocols, including, for example, encryption, backup, and sign-on verifications. Access to the information can be restricted by responder level and varying levels of administration. For example, a responder representative may be able to access only that non-user specific information related to alert messages transmitted to that particular responder and only upon providing valid authentication information to the system. Administrators with a higher level of authentication may be able to access a broader spectrum of information for purposes of providing county-wide, state-wide, or system-wide analysis of alerts and responses.

While recognizing the value that alert message data may provide, the principles behind the alert messaging system recognize that individuals may be reluctant to initiate alerts if they are concerned their personal information is being captured and stored. Users may be concerned that they could be mistaken in their concern over a possible emergency, they may be concerned about possible retaliation for reporting an event, or they may not want to get involved. For those reasons, the system provides options for not conveying or storing any alert message data at all or only conveying and storing non-personal alert message data. For example, by storing only non-personal data, all information that could identify a user, including the address of the user's device, can be eliminated from display to the responders or storage on the network. In this manner, the privacy of the user is maintained, and users may be more comfortable using the alert messaging system when an emergency occurs.

The foregoing descriptions of specific exemplary embodiments of the present invention have been presented for purposes of illustration and description. They are not intended to be exhaustive nor to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for initiating an alert message to one or more responders, comprising:

displaying an options screen on a user device, the displayed options comprising one or more of a report, alert report selection, and warning options;

upon receiving a selection of the report option, displaying an alert report selection screen;

determining whether alert information has been received in the required fields of the alert report selection screen; and upon determining that all required alert information has been correctly received:

automatically composing one or more customized alert messages based on the received information; and automatically transmitting the one or more of the customized alert messages to each of the one or more responders.

2. The method of claim 1, wherein each of the one or more responders to which to transmit the alert message is automatically determined based on the received alert information.

3. The method of claim 1, wherein upon receiving the selection of the report option, the method further comprises:

displaying a warning screen on the user device prior to displaying the alert report selection screen; and upon determining that an acceptance of the warning has been selected, displaying the alert reporting screen.

4. The method of claim 1, wherein the transmitted customized alert message includes a location of an emergency.

5. The method of claim 4, wherein the location of the emergency comprises one of:

a location of the user based on a Global Positioning System (GPS) location of the user device;

a location of the emergency based on the received alert information; and a combination of the GPS location of the user device and the received alert information.

6. The method of claim 1, wherein the one or more customized alert messages comprise a telephone call, a text message, an email message, or a social media message.

7. The method of claim 1, wherein automatically composing one or more customized alert messages comprises:

determining a nature of an alert event;

determining a location of the alert event;

determining responders to notify of the alert based on the nature and location of the alert event;

determining contact information and media communication types for each determined responder; and composing an alert message for each determined media type for each determined responder regarding the nature and location of the alert.

8. The method of claim 1, further comprising receiving one or more acknowledgement messages from the one or more responders.

9. A system for initiating alert messages to responders, the system comprising:

a processing device; and non-transitory computer readable data storage media storing instructions that, when executed by the processing device, cause the processing device to provide an alert messaging system, the alert messaging system operative to:

display an options screen on a user device, the displayed options comprising one or more of a report, alert report selection, and warning options;

upon receiving a selection of the report option, display an alert report selection screen;

determine whether alert information has been received in the required fields of the alert report selection screen; and upon determining that all required alert information has been received:

automatically compose one or more customized alert messages based on the received information; and automatically transmit the one or more of the customized alert messages to each of the one or more responders.

10. The system of claim 9, wherein displaying the alert report selection screen includes options to select one or more of the following:

compose alert message to report an emergency;

contact suicide hotline;

report bullying;

send help here;

send help there;

help—call here; and help—call there.

11. The system of claim 9, wherein the alert messaging system is further operative to:

determine from the received alert reporting information the type of alert being reported and a location of the alert event;

based on the determined type and location of the alert event, determine the responders to which the alert message should be transmitted;

based on the determined responders, obtain one or more addresses and alert message media communication types for each determined responder, with the one or more addresses corresponding to the one or more alert message communication types;

for each obtained message media communication type, compose a message based on the received alert information; and transmit each composed message to the one or more addresses corresponding to the message media communication types for each determined responder.

12. The system of claim 9, wherein the alert messaging system is further operative to receive responder contact information, wherein the responder contact information comprises one or more of:

responder location information;

available resources information;

available expertise information; and media communication types and addresses for receiving alert messages.

13. The system of claim 9, wherein the alert messaging system is further operative to store information from the one or more alert messages, the information comprising:

location information of the user based on GPS information for the user device;

location information entered by the user;

type of alert entered by the user;

date and time the alert messages are transmitted;

identification of the responders to which the alert messages are transmitted; and date and time each alert message is opened by the responder.

14. The system of claim 9, wherein the alert messaging system is further operative to:

receive responder contact information, wherein the responder contact information comprises one or more of:

responder location information;

available resources information;

available expertise information; and media communication types and addresses for receiving alert messages.

15. A non-transitory computer readable storage device including executable instructions for initiating an alert message to responders, which when executed by a processor, is operable to:

display an options screen on a user device, the displayed options comprising one or more of a report, alert report selection, and warning options;

upon receiving a selection of the report option, display an alert report selection screen;

determine whether alert information has been received in the required fields of the alert report selection screen; and upon determining that all required information has been correctly received:

automatically compose one or more customized alert messages based on the received information; and automatically transmit the one or more of the customized alert messages to each of the one or more responders.

16. The storage device of claim 15, wherein the device is further operable to receive responder contact information, wherein the responder contact information comprises one or more of:

responder location information;

available resources information;

available expertise information; and media communication types and addresses for receiving alert messages.

17. The storage device of claim 15, wherein the device is further operable to determine a location of the user, comprising:

determine whether location information has been entered;

if the location information has been entered, insert the entered location information into the alert message; and if the location information has not been entered, determine a Global Positioning System (GPS) location of the user and inserting the GPS location into the alert message.

18. The storage device of claim 15, wherein automatically composing one or more customized alert messages comprises:

determine a nature of an alert event;

determine a location of the alert event;

determine responders to notify of the alert based on the nature and location of the alert event;

determine contact information and media communication types for each determined responder; and compose an alert message for each determined media type for each determined responder regarding the nature and location of the alert.

19. The storage device of claim 15, wherein the identity of the user is neither recorded nor transmitted.

20. The storage device of claim 15, wherein the user is prompted for a response if a threshold amount of time has passed without receiving user input.

* * * * *